United States Patent
Hung et al.

(10) Patent No.: US 6,462,884 B2
(45) Date of Patent: *Oct. 8, 2002

(54) POLYMERIZABLE COMPOSITION AND OPTICAL ARTICLES USING THE SAME

(75) Inventors: William M. Hung, Alpharetta, GA (US); Guigui Wang, Alpharetta, GA (US)

(73) Assignee: Technology Resource International Corporation, Alpharetta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,975

(22) Filed: Jul. 16, 1999

(65) Prior Publication Data

US 2002/0004574 A1 Jan. 10, 2002

(51) Int. Cl.$^7$ .............................. G02B 9/00; G02B 27/10
(52) U.S. Cl. ..................... 359/642; 359/620; 359/619
(58) Field of Search ................................ 526/321, 326, 526/334; 264/1.1, 2.5, 1.38; 351/160 H, 160 R, 177; 359/642, 620, 619

(56) References Cited

U.S. PATENT DOCUMENTS

| | | | |
|---|---|---|---|
| 4,121,885 A | * 10/1978 | Erickson et al. | 351/177 |
| 4,166,255 A | * 8/1979 | Graham | 351/160 H |
| 4,171,878 A | * 10/1979 | Kivaev et al. | 351/160 R |
| 4,540,532 A | 9/1985 | Petcen et al. | 264/1.1 |
| 4,611,892 A | 9/1986 | Kawashima et al. | 351/159 |
| 4,650,845 A | 3/1987 | Hegel | 526/261 |
| 4,679,918 A | 7/1987 | Ace | 351/163 |
| 4,883,548 A | 11/1989 | Onoki | 156/99 |
| 4,912,185 A | * 3/1990 | Toh | 526/301 |
| 4,952,046 A | 8/1990 | Stephens et al. | 351/163 |
| 4,959,429 A | 9/1990 | Misura et al. | 526/230.5 |
| 5,160,668 A | 11/1992 | Imus | 264/1.7 |
| 5,415,816 A | 5/1995 | Buazza et al. | 264/1.38 |
| 5,442,022 A | 8/1995 | Keita et al. | 526/309 |
| 5,529,728 A | 6/1996 | Buazza et al. | 264/1.38 |
| 5,545,828 A | 8/1996 | Keita et al. | 526/72 |
| 5,556,931 A | 9/1996 | Imura et al. | 526/323.1 |
| 5,583,191 A | 12/1996 | Kawai et al. | 526/320 |
| 5,632,936 A | 5/1997 | Su et al. | 264/2.5 |
| 5,739,243 A | 4/1998 | Herold et al. | 526/325 |
| 5,880,171 A | 3/1999 | Lim et al. | 523/106 |

* cited by examiner

Primary Examiner—Georgia Epps
Assistant Examiner—Timothy Thompson
(74) Attorney, Agent, or Firm—Merchant & Gould, P.C.

(57) ABSTRACT

A polymerizable composition comprising an effective amount of at least one tetrafunctional acrylate monomer. In one embodiment of the invention, a polymerizable composition is a compound comprising of at least 50 percent by weight of at least one tetrafunctional acrylate monomer, from 5 to 20 percent by weight of at least one modified bisphenol A epoxy diacrylate monomer, from 0 to 25 percent by weight of at least one acrylate monomer selected from aliphatic difunctional and polyfunctional acrylates, from 0 to 3 percent by weight of at least one UV absorber, and a source of free radicals. The lens-forming material resulted from the polymerizable composition is introduced to a lens mold with a mold cavity having a configuration conforming to the optical lens to be molded. A radiation energy source is used to cure the lens-forming material in the filled mold. The radiation energy source comprises a U-shaped UV light. The U-shaped UV light has a first arm capable of delivering UV light in a first direction and a second arm capable of delivering UV light in an opposite second direction. The first and second arms are spaced apart and substantially parallel to each other, thereby defining a space therebetween. The filled mold is placed at the center of the space therebetween the first and second arms to receive the radiations from the first and second directions for curing. The resultant lens has an inherently integrated "hard-soft-hard" structure cross-sectionally.

12 Claims, 2 Drawing Sheets

POLYMERIZABLE COMPOSITION AND OPTICAL ARTICLES USING THE SAME

BACKGROUND OF THE INVENTION

1. Field of the Invention

The present invention relates to polymerizable compositions, polymerizates prepared from such compositions and optical articles prepared from such polymerizates. In particular, the present invention discloses a class of polymerizable compositions useful in making optical lenses which can offer superior abrasion resistance, impact resistance and/or UV protection. Moreover, the present invention discloses an apparatus and method for making optical articles using a radiation energy source capable of delivering radiations from opposite directions.

2. Background

Plastic lenses have over time become desirable for use in making optical lenses, especially of the kind useful for eyeglasses. Plastic lenses offer several advantages over glass lenses, including reduced weight and increased strength. Generally, plastic lenses for eyeware have been formed from diethylene glycol bis(allylcarbonate)("DAC")(also known as "CR39"), which has been polymerized via free radical polymerization. DAC lenses offer relatively high impact resistence, light weight, ease of machining and polishing, and ease of dyeing. However, DAC lenses do not offer desirable abrasion resistance.

Plastic lenses can also be produced by molding of thermal plastic resins, such as polymethyl methacrylate (PMMA) and polycarbonate. However, both types of lenses have inherent drawbacks: PMMA lenses offer poor impact resistance while polycarbonate lenses offer inadequate abrasion resistance as well as solvent resistance.

One way the art has sought to improve abrasion resistance for plastic lenses includes the use of a hard coat on the surfaces of the lense through thermal curing or UV radiation curing. For example, U.S. Pat. No. 4,611,892 discloses an improved synthetic resin lens and a method for modifying the surface of the synthetic resin lens to form an inorganic film or hard coating layer securely on the surface. However, the additional hard coating process is often time consuming and has the potential to lower the overall yield of the production. Additionally, the boundary between the coating layer and the surface of the lens may cause optical defect in the resultant lens. Moreover, because currently available UV curing process utilizes a single UV light source projecting radiation energy onto a mold filled by a lens-forming material asymmetrically, the resultant lens may have surfaces with unevenly distributed hardness. The overall quality of the resultant lens may be compromised by the unevenly distributed hardness. Thus, there is a need in the art for a new curing process and apparatus that may provide more evenly distributed hardness at a reduced curing time.

The art has also looked to the polymerizable composition in producing lenses with better optical properties.

For example, U.S. Pat. No. 5,739,243 discloses polymerizable compositions of 5 to 90 weight percent of a first monomer component, which is a diacrylate of alkoxylated bisphenol A having 25 to 35 ethoxy units, and 10 to 95 weight percent of a second monomer component having at least three acrylate groups.

U.S. Pat. No. 5,556,931 discloses polymerizable compositions comprising at least two ethoxylated bisphenol A dimethacrylate type monomers, the content of which is 30 to 80 mole % having 2 to 3 ethoxy units, 20 to 50 mole % having 6 to 12 ethoxy units and less than 20 mole % having other than 2 to 30 and 6 to 12 ethoxy units.

Similarly, U.S. Pat. No. 5,583,191 discloses a transparent resin obtained by polymerizing a monomer having an alkylene oxide group, and a polyfunctional (meth) acrylate having a divalent branched hydrocarbon group.

U.S. Pat. Nos. 5,545,828 and 5,442,022 disclose polymer compositions for use in the manufacture of ophthalmic lenses composing at least 50% by weight of one to two modified bisphenol A diacrylates.

U.S. Pat. No. 5,415,816 discloses a polymerizable composition comprising bisphenol A bis(allyl carbonate) monomer and acrylate monomers.

U.S. Pat. No. 4,912,185 discloses a cross-linkable polymeric casting composition including aliphatic diacrylate (such as polyoxyalkylene glycol diacrylate) in amounts of from approximately 40% to 60% by weight, and at least one polyfunctional unsaturated cross-linking agent, such as tri or tetrafunctional acrylate, present in amounts of from approximately 10 to 30% by weight, preferably approximately 20% by weight based on the total weight of the casting composition.

In spite of the foregoing, the need still exists for a polymerizable composition that can be used to produce better optical lenses, which can offer superior abrasion resistance, impact resistance and/or UV protection.

SUMMARY OF THE INVENTION

Among other things, the present invention is based upon the surprising discovery that the use of an effective amount of at least one tetrafunctional acrylate monomer in a polymerizable composition results in optical lenses which may offer superior abrasion resistance without compromising impact resistance of the resultant lenses.

In addition, the inventors have discovered that the use of a radiation energy source capable of delivering radiations from opposite directions for curing the resins can produce better lenses with a substantially symmetrically-distributed hardness. The new curing process is time efficient and the resultant lens has an inherently integrated "hard-soft-hard" structure which offers superior impact resistance.

In this regard, one aspect of the invention relates to a polymerizable composition comprising at least 50 percent by weight of a tetrafunctional acrylate monomer. In one embodiment of the invention, a polymerizable composition is a compound comprising of at least 50 percent by weight of a tetrafunctional acrylate monomer, from 5 to 30 percent by weight of at least one modified bisphenol A epoxy diacrylate monomer, and from 0 to 3 percent by weight of at least one UV absorber.

Also, the invention relates to a polymerizable composition comprising at least 50 percent by weight of at least one tetrafunctional acrylate monomer, from 5 to 30 percent by weight of at least one modified bisphenol A epoxy diacrylate monomer, from 0 to 25 percent by weight of at least one acrylate monomer selected from aliphatic difunctional and polyfunctional acrylates, and from 0 to 3 percent by weight of at least one UV absorber.

In another embodiment, the invention relates to a polymerizable composition comprising at least 50 percent by weight of at least one tetrafunctional acrylate monomer, from 5 to 20 percent by weight of at least one modified bisphenol A epoxy diacrylate monomer, from 0 to 25 percent by weight of at least one acrylate monomer selected from aliphatic difunctional and polyfunctional acrylates, from 0 to 3 percent by weight of at least one UV absorber, and a source of free radicals.

In addition, the invention relates to resins that are the product of polymerization of the polymerizable compositions described above and can be used as a lens-forming material.

In another aspect, the invention provides a method of preparing an optical article from a curable material containing a radiation absorber. The method includes the steps of providing a radiation energy source that has a first region delivering radiation in a first direction and a second region delivering radiation in an opposite second direction, wherein the first and second regions are arranged so as to define a space therebetween, and the space is subjected to the radiation in the first direction from the first region and the radiation in the second direction from the second region, placing the curable material in the space therebetween the first and second regions of the energy radiation source and curing the curable material to obtain the optical article by exposing the curable material to radiations from the first and second regions of the radiation energy source.

In one embodiment of the present invention, the method can be practiced to prepare an optical lens by forming a lens mold cavity having a configuration conforming to the optical lens to be molded, introducing a liquid lens-forming material into the mold cavity, wherein the liquid lens-forming material contains a UV absorber, providing a radiation energy source that has a first region delivering radiation in a first direction and a second region delivering radiation in a second, typically opposite, direction, wherein the first and second regions are arranged so as to define a space therebetween, and the space is subjected to the radiation in the first direction from the first region and the radiation in the second direction from the second region, placing the mold filled with the liquid lens-forming material in the space therebetween the first and second regions of the energy radiation source, and curing the lens-forming material within the lens mold cavity to obtain the optical lens by exposing the lens-forming material to radiations from the first and second regions of the radiation energy source.

In another embodiment of the present invention, the mold is placed substantially at the center of the space therebetween the first and second regions of the radiation energy source. Preferably, each of the first and second regions delivers UV light.

Moreover, the present invention relates to an apparatus for making an optical article. In one embodiment of the invention, the apparatus includes a mold assembly having a mold cavity. The mold assembly can have a first and second mold members to form the mold cavity for receiving a liquid curable material. The apparatus also includes a radiation energy source for curing the liquid curable material within the mold cavity to obtain the optical article. The radiation energy source includes a first region capable of delivering radiation in a first direction and a second region capable of delivering radiation in an opposite second direction. The first and second regions are arranged so as to define a space therebetween. In use, the mold assembly is located at the space therebetween the first and second regions so that the curable material is exposed to the radiations in opposite directions simultaneously from the first and second regions of the radiation energy source during curing.

In a particular embodiment of the invention, the energy radiation source includes two UV lights. The first UV light is located at the first region, and the second UV light is located at the second region. The relative distance between the two UV lights is adjustable. In another embodiment of the invention, the radiation energy source preferably includes a U-shaped UV light. The U-shaped UV light has a first arm capable of delivering UV light in a first direction and a second arm capable of delivering UV light in an opposite second direction. The mold assembly is placed between the first and second arms of the U-shaped UV light.

The apparatus and method of the present invention can be used for making optical lenses. For example, as discussed in detail below, optical lenses with better mechanical properties can be produced by using the apparatus and the method of the present invention, together with the polymerizable compositions of the present invention. It needs to be emphasized that, however, the polymerizable compositions of the present invention can be used for making optical articles using currently available apparatuses and methods. Likewise, the apparatus and method of the present invention can be used for making optical articles using currently available polymerizable compositions. Moreover, in addition to optical lenses, the present invention can be practiced in numerous applications including coatings, adhesives, medical plastics, fiber optics and glazing materials.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

The present invention may be understood more readily by reference to the following detailed description of preferred embodiments of the invention.

Before the present articles and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

The present invention will now be described in detail with reference to the accompanying drawings.

The Apparatus

Figure 1:
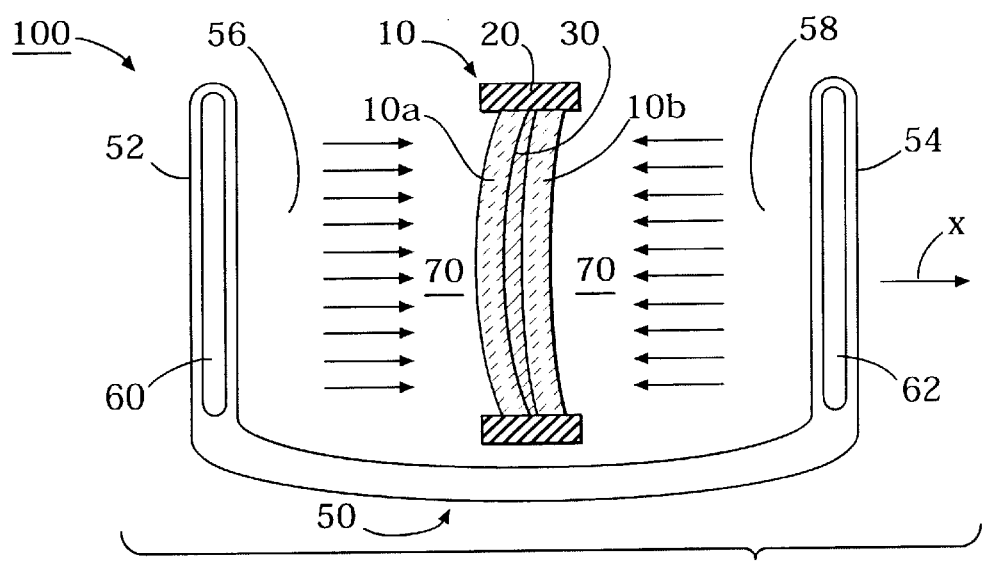
FIG. 1 is a schematic top cross-sectional view of a first embodiment of an apparatus for molding optical lens according to the present invention.

Reference is first made to FIG. 1, which generally relates to an apparatus for manufacturing an optical article according to the present invention. The optical article can be optical lenses, fiber optics, medical plastics, glazing materials, or any other device that may be produced by curing through exposure to radiation. In the following description, the apparatus is described in relation to an optical lens as merely an example.

The apparatus 100 has a mold assembly 10 and a radiation energy source 50. The radiation energy source 50 is capable of delivering radiation from a first region 56 in direction X, and from a second region 58 in a direction opposite direction X. The first region 56 and second region 58 are facing each other, thereby defining a space 70 therebetween. The mold assembly 10 is placed in the space 70 so as to receive radiations from the first region 56 in direction X and from the second region 58 in the direction opposite direction X. In the first embodiment of the present invention as shown in FIG. 1, the radiation energy source 50 is a U-shaped device. The device has a first arm 52 and a second arm 54. The first arm 52 is located at the first region 56 and the second arm 54 is located at the second region 58. The device includes a first radiation generating component 60 located at the first arm 52 and a second radiation generation component 62 located at the second arm 54. The radiation generating components 60 and 62 each may have a single radiation source such as a UV light, or may have a collection of multiple radiation sources. The UV light can be any UV source including a line light source, as shown in FIG. 1, a point light source, or a combination of various types of light sources.

Figure 2:
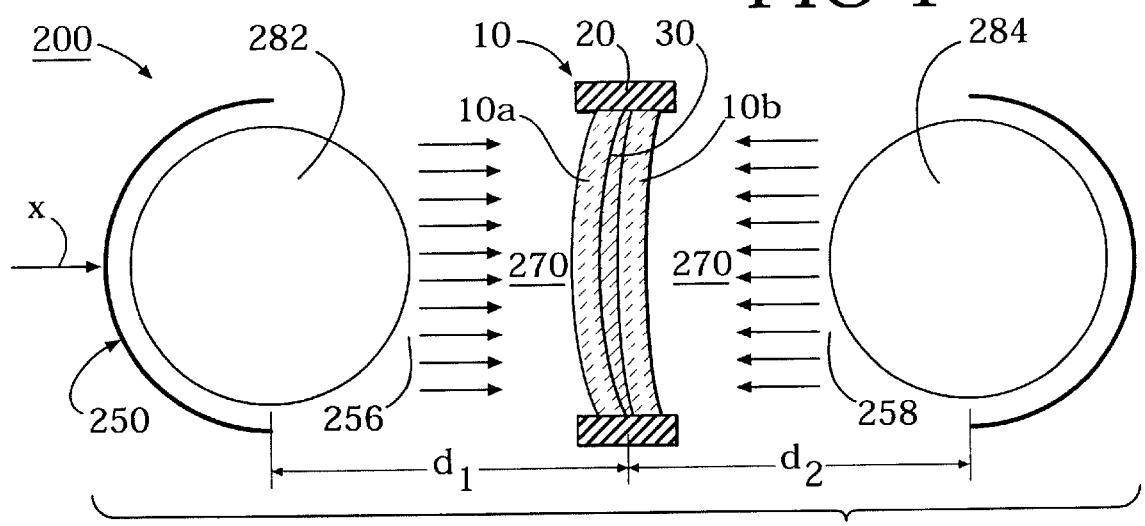
FIG. 2 is a schematic side cross-sectional view of a second embodiment of an apparatus for molding optical lens according to the present invention.

Alternatively, in the second embodiment of the present invention as shown in FIG. 2, the radiation energy source 250 includes at least two separate radiation generating components 282, 284 facing each other. The first radiation generating component 282 delivers radiation from a first region 256 in direction X, and the second radiation generating component 284 delivers radiation from a second region 258 in the direction opposite direction X. The mold assembly 10 placed in the space 270 defined therebetween the first region 256 and the second region 258 receives radiations from the radiation generating components 282 and 284 in opposite directions. Each of the radiation generating components 282 and 284 may include a UV light, or a collection of light sources.

Figure 3:
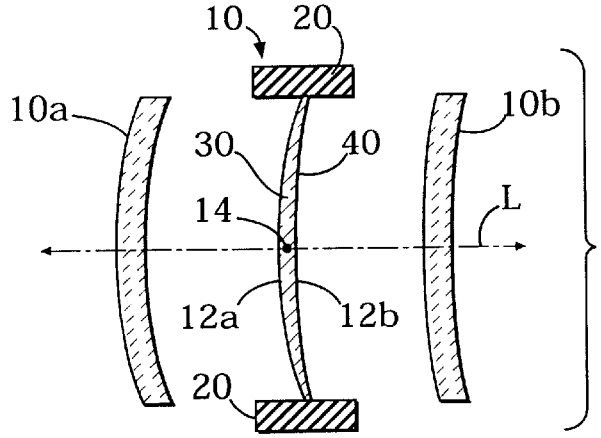
FIG. 3 is a schematic cross-sectional diagram of a mold member used in FIG. 1.

As shown in FIG. 3, the mold assembly 10 is formed by two molding shells 10a and 10b and an annular closure member 20 at the periphery of the molding shells 10a and 10b, defining between them a molding cavity 30 to receive a lens-forming material 40.

The molding shells 10a and 10b are rotationally aligned relative to each other and axially positioned apart from each other at the desired axial separation distance, e.g., the appropriate separation to produce a lens of a desired thickness d. When properly positioned, the facing inside surfaces of the molding shells 10a, 10b are a negative image of the required opposing surfaces 12a, 12b of the optical lens to be formed. These surfaces are coaxial in the embodiments shown with a common axis L. Cross-sectionally, they have a common center 14. The distance between the surfaces 12a and 12b, measured along the axis L and passing the center 14, is defined as the thickness of the optical lens to be formed.

As shown in FIGS. 1–3, the molding shells 10a, 10b have a generally circular outside contour. Obviously, the contour may take other suitable geometric shapes such as oval, rectangular, or square. In an embodiment of the present invention (not shown), the molding shells 10a, 10b are flat glass plates.

The closure member 20 in the embodiment shown in FIGS. 1–3 is a tubular sleeve. The tubular sleeve engages the edges of the molding shells 10a, 10b to form the molding cavity 30. Alternatively, the closure member 20 may be in the form of a gasket (not shown).

Referring now to the apparatus 200 shown in FIG. 2, the mold assembly 10 is placed in the space 270. Radiations from the first region 256 and the second region 258 are delivered to the mold assembly 10 to allow the lens-forming material 40 within the molding cavity 30 to cure. The curing process is substantially the same for the embodiment shown in FIG. 1. Generally speaking, a radiation generating component can be any device that emits heat or energy, such as x-ray source, conventional light, UV light, microwave generator, x-ray source, etc. In the embodiments shown in FIGS. 1–3, UV light sources are chosen as the preferred radiation generating components.

In the embodiment shown in FIG. 2, the exposure of the lens-forming material 40 within the molding cavity 30 to the radiation energy source 250 can be varied by adjusting the relative distance $d_1$ between the radiation generating element 282 and the mold assembly 10 and the relative distance $d_2$ between the radiation generating element 284 and the mold assembly 10. For instance, if the apparatus 200 is set up with $d_1 < d_2$, and other conditions are equal, the lens-forming material proximate the surface 12a receives more exposure than the lens-forming material proximate the surface 12b. The opposite is true if the apparatus 200 is set up with $d_1 > d_2$. Obviously, if the apparatus 200 is set up with $d_1 \sim d_2$, the exposure of the lens-forming material 40 will be substantially symmetrical. Similar adjustment can be made in the embodiment shown in FIG. 1 to control the exposure of the lens-forming material. Alternatively, the exposure of the lens-forming material 40 within the molding cavity 30 may be varied by choosing different radiation generating components, or controlling the exposure time of the lens-forming material 40 to the radiation energy delivered from the first region 256 and/or the second region 258. Obviously, a suitable control device, such as a CPU (not shown), can be utilized to coordinate the radiation activities including the exposure time and radiation intensity from different regions.

The Lens-forming Material

Generally speaking, lens-forming material 40 suitable for use in the apparatus 100 includes any polymerizable composition that is curable. Examples of such material includes DAC, PMMA, polycarbonate, CR39 and other compositions normally used in the art. However, the inventors have discovered that it is advantageous to choose a polymerizable composition including an effective amount of at least one tetrafunctional acrylate monomer. Preferably, the tetrafunctional acrylate monomer is present in an amount of at least 50%, and more preferably from 55% to 75% by weight, based on the total weight of the polymerizable compositions.

As used herein, the term "functional" refers to groups that are reactive on curing with radiation, such as acrylates and methacrylates. In general, acrylates are preferred over methacrylates for use in a polymerizable composition, because acrylates cure more quickly than methacrylates, thereby reducing processing time. Examples of suitable tetrafunctional acrylate monomers include: Pentaerythritol tetraacrylate (SR295, available from Sartomer Company), di-trimethylolpropane tetraacrylate (SR 355, available from Sartomer Company), Ethoxylated Pentacrythritol tetraacrylate (SR 494, available from Sartomer Company), Ebecryl® 40 tetraacrylate monomer (EB40, available from UCB Chemicals Corp.), Ebecryl® 140 tetraacrylate monomer (EB140, available from UCB Chemicals Corp.), and Pentaerythritol acrylate monomer (PETA-K, available from UCB Chemicals Corp.). In a preferred embodiment, a polymerizable composition can just include one tetrafunctional acrylate monomer, such as EB40. Or, polymerizable composition of the present invention can include more than one tetrafunctional acrylate monomers.

In addition to the tetrafunctional acrylate monomer, there are many materials which may optionally be present in the polymerizable composition. These optional materials include difunctional acrylate monomers and trifunctional acrylate monomers. Examples of difunctional acrylate monomers include: bisphenol A epoxy diacrylate monomer, modified bisphenol A epoxy diacrylate monomer, low viscosity modified epoxy acrylate, tripropylene glycol diacrylate, 2,2-Bis [4(methacryloxy) phenylpropane] with total ethylene oxide number around 2.6, and bisphenol A ethoxylate (1EO/phenol) diacrylate. Examples of trifunctional acrylate monomers include: trimethylolpropane triacrylate, pentaerythritol triacrylate and trimethylolpropane ethoxy triacrylate. In one embodiment of the invention, a polymerizable composition is a compound comprising of at least 50 percent by weight of a tetrafunctional acrylate monomer, from 5 to 30 percent by weight of at least one difunctional diacrylate monomer, and from 0 to 25 percent by weight of at least one trifunctional acrylate monomer.

Another material which may be present is radiation absorber. Radiation absorbers are used preferentially to absorb incident radiation, thereby preventing the radiation from reaching the casted polymer. Therefore, the type of radiation absorber should be determined by the type of radiation used. For example, if the radiation is x-ray, the radiation absorber should be responsive to x-ray. In several embodiments of the present invention, UV lights are chosen as the preferred radiation energy sources. Thus, UV absorber is used as radiation absorber. UV absorber may be incorporated into a lens-forming material by procedures well known in the art to provide proper UV protection. UV absorbers of interest to the present invention include: benzoic acid esters, cyano and carbomethoxy acrylates, oxalic acid diamides, and hydroxyphenyltriazines. Particular suitable for use in the present invention as UV absorber groups are benzophenones and benzotriazoles including: 2-(2'-hydroxyphenyl) benzotriazoles, for example, the 5'-methyl, 3', 5'-di-tert-butyl, 5'-(1, 1, 3,3-tetramethylbutyl), 5-chloro-3',5'-di-tert-butyl, 5-chloro-3'-tert-butyl-5-methyl, 3'-sec-butyl-5'-tert-butyl, 4'-octoxy, 3',5'-di-tert-amyl, 3',5'-bis (α,α-dimethylbenzyl), and 5'-methacryloxy-ethyl derivatives, and 2-hydroxybenzophenones, for example the 4-hydroxy, 4-methoxy, 4-octoxy, 4-decyloxy, 4-dodecyloxy, 4-benzyloxy, 4, 2',4'-trihydroxy, 2'-hydroxy-4,4'-dimethoxy and 4-methacryloxy derivatives. In another embodiment of the invention, a polymerizable composition includes at least 50 percent by weight of a tetrafunctional acrylate monomer, from 5 to 30 percent by weight of at least one difunctional diacrylate monomer, from 0 to 25 percent by weight of at least one trifunctional acrylate monomer, and from 0 to 3 percent by weight of at least one UV absorber.

Yet other optional materials such as photointiators, co-initiators, colors, dyes, or other free radical source may also be incorporated into a polymerizable composition of the present invention. Examples of suitable free radicals include: 2-methyl-4-(methylthio)-2-morpholinopropiophenone, 1-hydroxycyclohexyl phenyl ketone, diphenyl (2, 4, 6-trimethylbenzoyl) phosphine oxide, triphenylphosphine, Bis(2,6-dimethoxybenzoyl)-2,4, 4-trimethyl pentyl phosphine oxide, 2-hydroxy-2-methyl-1-phenylpropan-1-one, 2-benzyl-2-N, N-dimethylamino-1-(4-morpholinophenyl)-1-butanone, 2,2-dimethoxy-2-phenylatetophenone,2,4,6-trimethylbenzoyldiphenyl-phosphine oxide and 4-(2-hydroxyethoxy) phenyl-(2-propyl)ketone. In one embodiment of the invention, a polymerizable composition includes of at least 50 percent by weight of a tetrafunctional acrylate monomer, from 5 to 30 percent by weight of at least one difunctional diacrylate monomer, from 0 to 25 percent by weight of at least one trifunctional acrylate monomer, and from 0 to 3 percent by weight of at least one UV absorber, and a source of free radicals.

The listing of optional materials discussed above is by no means exhaustive. These and other materials may be employed in their customary amounts for their customary purposes so long as they do not seriously interfere with good polymer formulating practice.

Process of Polymerization and Lens-Making

Several comparison tests were performed to display the advantages that can be associated with the present invention. The following examples from the comparison tests illustrate but do not limit the scope of the invention. Some of the results obtained through these examples are shown in Table I–V. Meanings of the abbreviations used in Table I–V are as follows:

| | |
|---|---|
| EB40: | Tetrafunctional acrylate |
| EB6040: | Low viscosity modified epoxy acrylate - difunctional |
| EB3720TP40: | EB3720 diluted with 40% of TRPGDA - difunctional |
| EB3720: | Bisphenol A epoxy diacrylate - difunctional |
| TRPGDA: | Tripropylene glycol diacrylate - difunctional |
| TMPTA-N: | Trimethylolpropane triacrylate - trifunctional |
| BPE-100: | 2,2-Bis [4(methacryloxy) phenylpropane] with total ethylene oxide number around 2.6 - difunctional |
| BAEDA (1): | Bisphenol A ethoxylate (1EO/phenol) diacrylate - difunctional |
| IRG907: | 2-methyl-4-(methylthio)-2 morpholinpropiophenone |
| IRG184: | 1-Hydroxyclohexyl phenyl ketone |
| DBPO: | Diphenyl (2,4,6-trimethylbenzoyl) phosphine oxide |
| TPP: | Triphenylphosphine |
| TINUVIN ® 328: | 2[2'-hydroxy-3',5'-di-tert-amyl) phenyl] benzotriazole (UV absorber, available from Ciba Geigy) |
| TINUVIN ® 234: | 2-[3',5' Bis (1-methyl-1-phenylethyl)-2' Hydroxphenyl] benzotriazole (UV absorber, available from Ciba Geigy) |
| Morplas Violet 3B: | Dye |
| FC430: | FLURAD ™ FC-430 from 3M Specialty Chemicals Division |

In each experiment, optical lenses were prepared by introducing the desired composition containing the various monomers described above into a lens mold assembly 10 constituted by a glass two-part mold and a gasket, such as one shown in FIG. 3, and placing the filled mold to expose to a radiation energy source as shown in FIG. 2 to initiate a curing process. Two UV light sources are chosen as the radiation generating components 282 and 284. Where the UV light sources are low-pressure mercury ultraviolet lamps, such as double bore phosphor ultraviolet lamps, type 2094, manufactured by Jelight Company, Inc., the curing process lasts about three minutes. The cast lens then was removed from the mold and post-cured by exposure to high intensity ultraviolet radiation provided by Fusion UV System, Model LC-6, for about 10 seconds.

Alternatively, the polymerizable compositions disclosed herein can also be polymerized using conventional methods and apparatus for polymerization known to those skilled in the art.

For the lenses made from the polymerizable composition of the present invention having UV absorber, since the UV absorber in the lens-forming material absorbs part of UV radiation energy needed for photo-initiation, the lens-forming material at the outer part of the mold may receive a higher UV energy exposure than its counter part at the center part of the mold. Therefore, the outer part of the formed lens can have a higher level of polymerization than the center part of the formed lens. Morever, because the lens-forming material simultaneously receives the UV radiations from each side of the molds, the polymerization is realized substantially symmetrically. In terms of hardness, the resultant lens has an inherently integrated "hard-soft-hard" structure, i.e., a hard surface-soft center-surface structure. Some of the advantages of this unique structure can be demonstrated by the following tests.

COMPARISON STUDY

1 Abrasion Resistance Test

Two methods, method A and method B, were used to test the abrasion resistance of the optical lenses made from polymerization compositions of the present invention that include an effective amount of at least one tetrafunctuional acrylate monomer against the optical lenses made from polymerizable compositions that do not include an effective amount of at least one tetrafunctional acrylate monomers. Method A is Bayer-SRC test, which measures Bayer ratio of the tested optical lenses. This test was performed by Colts Laboratories at Clearwater, Fla., an independent, outside lab from the entity the inventors are associated with. The second method, method B, is to use a weight-based device made in-house (not shown). The device has a shaft means to receive weights at the top and transfer weight to a square tip, which is at the bottom end of the shaft means and covered with a piece of 12-micron sand paper. The tip engages a tested lens directly and moves in a circular motion on the surface of the tested lens at a speed of about 0.5 turn/sec. After one entire turn, the amount of scratches on the tested lens is checked visually. If no apparent scratch is observed, more weight is added and the process is repeated until a scratch is observed. The unit of weight may be chosen to accommodate the needs. For the tests shown in Table I and Table II, the unit of weight was chosen as 50.0 g. Thus, for example, in Test 2, 2.5 units of weight represent 2.5×50.0 g=125 grams, under which the tested lens developed no visible scratches.

Specifically, Table I shows the results obtained from the abrasion resistance tests on the optical lenses made from polymerizable compositions of the present invention with an effective amount of at least one tetrafunctional acrylate monomer. Table II shows the results obtained from the abrasion resistance tests on the optical lenses made from polymerizable compositions without an effective amount of at least one tetrafunctional acrylate monomer. In each case of Table I, the lens made from the polymerizable compositions of the present invention showed superior abrasion resistance. For example, in Test 1 performed by Colts Laboratories, the lens made from one of the polymerizable compositions of the present invention shows Bayer ratio 1.4 times better than a uncoated CR-39 lens. Moreover, in Tests 2–4 performed by the inventors, the lenses made from the polymerizable compositions of the present invention show complete abrasion resistance under the stress of weights at least up to 125 grams. In other words, these lenses showed no visibly/apparent scratches under the stress of weights up to at least 125 grams. In sharp contrast, as shown in Table II, the lenses made form the polymerizable compositions that do not include an effective amount of tetrafunctional acrylate monomers, showed poor abrasion resistance. Each lens displayed visible scratches under the rotating tip of the in-house made device, even without any weights added to the shaft means.

TABLE I

| Experiment | EB40 (wt %) | EB6040 (wt %) | EB3720TP40 (wt %) | TMPTA -N(wt %) | TRG907 (wt %) | TPP (wt %) | DBPO (wt %) | TINUVIN® 328 (wt %) | Morplas Violet 3B (ppm) | FC430 (wt %) | Abrasion resistance test A | B |
|---|---|---|---|---|---|---|---|---|---|---|---|---|
| 1 | 61.3 | 10.9 | 16.9 | 10.9 | 0.223 | 0.357 | 0.134 | 0.0268 | 15.8 | | 1.4 | |
| 2 | 61 | 11 | 17 | 11 | 0.225 | 0.36 | 0.2 | 0.027 | 0 | | | 2.5 |
| 3 | 61 | 11 | 17 | 11 | 0.3 | 0.5 | 0.2 | 0.016 | 8.25 | 0.2 | | 2.5 |
| 4 | 61 | 11 | 17 | 11 | 0.3 | 0.5 | 0.2 | 0.045 | 10.0 | | | 3.0 |

TABLE II

| Experiment | EB40 (wt %) | BAEDA(1) (wt %) | BPE-100 (wt %) | TMPTA -N(wt %) | TRG907 (wt %) | TPP (wt %) | DBPO (wt %) | TINUVIN® 328 (ppm) | Morplas Violet 3B (ppm) | FC430 (wt %) | Abrasion resistance test (B) |
|---|---|---|---|---|---|---|---|---|---|---|---|
| 1 | 45 | 45 | | 10 | 0.225 | 0.36 | 0.135 | 0.027 | 10.0 | 0.2 | 0 |
| 2 | 35 | 60 | | 5 | 0.225 | 0.36 | 0.135 | 0.027 | 10.0 | 0.2 | 0 |
| 3 | 40 | | 50 | 10 | 0.225 | 0.36 | 0.135 | 0.027 | 10.0 | 0.2 | 0 |

COMPARISON STUDY
2 Impact Resistance Test

The impact resistance of the optical lenses made from polymerizable compositions of the present invention was evaluated in accordance with ANSI Z80.1-1987 by performing the FDA drop ball test. Specifically, a ⅝-inch diameter steel ball weighing approximately 0.57 ounce is dropped from a height of 127 cm (50 inches) upon the horizontal upper surface of a tested lens. The tested lens is considered to pass the drop ball test if it does not fracture or crack under the impact. FDA regulations require that lenses for human use pass the test.

Table III shows the results obtained from two tests. Each test used a set of three lenses. As shown in Table III, all three lenses used in the first test passed the drop ball test while all three lenses used in the second test were cracked during the test. The only difference between the first set of three lenses and the second set of three lenses is that the former contains 0.027% by weight a UV absorber, namely, TINUVIN® 328. Thus, the results shown in Table III indicate that a UV absorber is capable of preventing the lenses from cracking.

The tested lens was made from a polymerizable composition of the present invention prepared according to Table IV. A sample of plate with thickness of 2 mm was made by injecting the monomer mixture of Table IV into a mold comprising two pieces of flat glass plates with a 2 mm spacer. The filled plate mold was then irradiated with two UV lamps, each of them is a double bore phosphor ultraviolet lamp, type 2094, with a maximum emission at 330 nm and a band width of 37 nm, manufactured by Jelight Company, Inc. from each side of the mold, as shown in FIG. 2, for 3 minutes as discussed above. The hardness of the resultant plastic plate was then measured. Six points for each area were taken for each hardness measurement.

Figure 4:
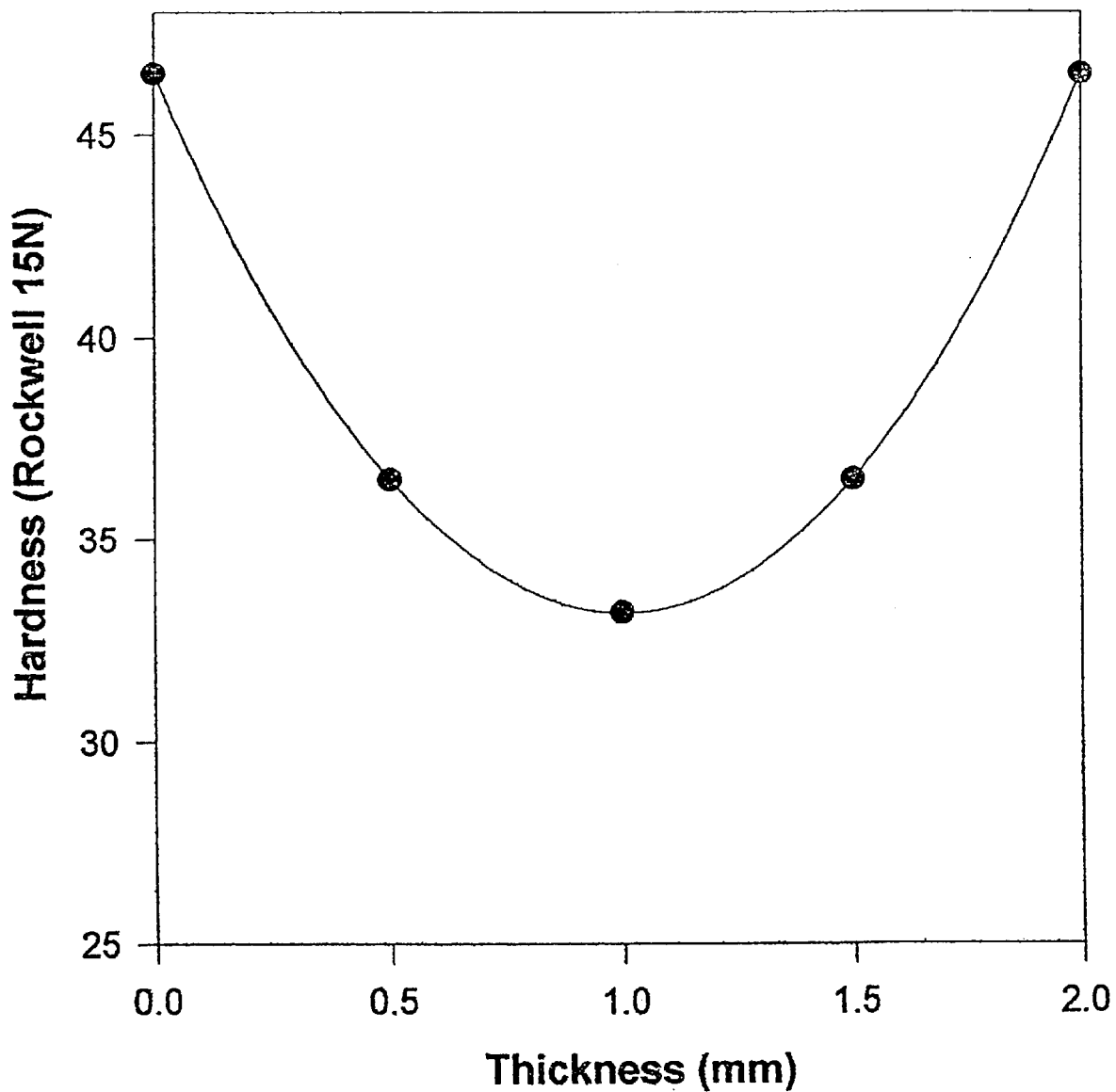
FIG. 4 is a diagram showing the cross-sectional analysis of lens hardness for one optical lens made according to the present invention.

FIG. 4 shows the result of the hardness measurement of the tested lens. The hardness, in unit of Rockwell 15N, displays peak values at the surfaces of the lens and then gradually decreases toward to the center of the lens. For the

TABLE III

| Experiment | EB40 (wt %) | EB6040 (wt %) | EB3720TP40 (wt %) | TMPTA -N(wt %) | TRG907 (wt %) | TPP (wt %) | DBPO (wt %) | TINUVIN® 328 (wt %) | Morplas Violet 3B (ppm) | Dropball test |
|---|---|---|---|---|---|---|---|---|---|---|
| 1 | 61 | 11 | 17 | 11 | 0.225 | 0.36 | 0.135 | 0.027 | 5.5 | pass |
| 2 | 61 | 11 | 17 | 11 | 0.225 | 0.36 | 0.135 | 0 | 5.5 | 0 |

COMPARISON STUDY
3 Cross-Sectional Hardness Test

The cross-sectional hardness of optical lenses made from polymerizable compositions of the present invention was measured at different locations of the lens cross-sectionally. Specifically, a Rockwell hardness tester (Model 3TY, manufactured by Wilson Mech. Inst. Div., American Chain and Cable Co., Inc., New York, N.Y.) was used to measure the hardness of the surfaces, the central area, and the areas between the surfaces and the center of a tested lens.

embodiment shown in FIG. 3 and Table IV, the hardness is substantially symmetrical about the center of the lens. The hardness of the tested lens varies across the body of the lens boundlessly, decreasing from the first surface to about the center of the body and then increasing from there to the second surface of the lens. It indicates that the surfaces of the lens are the hardest and the center region of the lens is softest. Therefore, in term of hardness, FIG. 4 illustrates a lens of the present invention with an inherently integrated "hard-soft-hard" cross-sectional structure.

TABLE IV

| Experiment | EB40 (wt %) | EB6040 (wt %) | EB3720TP40 (wt %) | TMPTA -N(wt %) | TRG907 (wt %) | TPP (wt %) | DBPO (wt %) | TINUVIN ® 328 (wt %) | Morplas Violet 3B (ppm) |
|---|---|---|---|---|---|---|---|---|---|
| 1 | 61 | 11 | 17 | 11 | 0.225 | 0.36 | 0.135 | 0.027 | 12.5 |

COMPARISON STUDY

4 UV Protection Test

A polymerizable composition according to the present invention was prepared using the following monomers (or oligomers) by relative percent in weight: EB40:EB3720TP40:EB6040:TMPTA-N=61:17:11:11. The compounds shown in Table V were then introduced as additives to compare UV protection for each lens made. Table V shows the results.

Specifically, light transmittance of UVA and UVB for lenses tested in Experiment 1–3 was less than 5%, which indicates excellent UV protection. In contrast, light transmittance of UVB for lenses tested in Experiment 4 and 5 was more than 20%, which indicates inadequate, or poor UV protection. As clearly indicated in Table V, a principal difference between the lenses used in Experiment 1–3 and the lenses used in Experiment 4 and 5 is that the former had UV absorber while the latter had none of the UV absorber.

TABLE V

| Experiment | TRG907 (wt %) | TRG184 (wt %) | TPP (wt %) | DBPO (wt %) | TINUVIN ® 328 (wt %) | TINUVIN ® 234 (wt %) | Light transmittance (%) | | |
|---|---|---|---|---|---|---|---|---|---|
| | | | | | | | UVA | UVB | visible |
| 1 | 0.30 | | 0.50 | 0.1 | 0.04 | | 1 | 3 | 93 |
| 2 | 0.225 | | 0.36 | 0.135 | 0.027 | | 1 | 4 | 93 |
| 3 | 0.225 | | 0.36 | 0.135 | | 0.027 | 1 | 4 | 93 |
| 4 | | 0.30 | 0.50 | 0.20 | | | 1 | 31 | 93 |
| 5 | 0.30 | | 0.50 | | | | 1 | 22 | 90 |

The present invention has been described with reference to specific details of particular embodiments thereof. It will be apparent to those skilled in the art that various modifications and variations can be made in the present invention without departing from the scope or spirit of the invention. For example, more than two radiation energy sources may be utilized to further speed up the curing process.

Moreover, although it is preferable to use the apparatus and method of the present invention to make optical articles from a polymerizable composition that includes a radiation absorber, for example a UV absorber when the radiation energy sources are UV light sources, the apparatus and method of the present invention may be used to make optical articles from a polymerizable composition that does not include a radiation absorber, as long as the polymerizable composition is a curable material. The multiple radiation energy sources utilized in the apparatus and method of the present invention can provide uniform, quick, and symmetrical curing for any curable materials.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An optical article made from a polymerizable composition, the optical article comprising:
   (a) a first surface;
   (b) a second surface; and
   (c) a body defined by the first surface and the second surface with a center and a thickness;
   wherein a hardness of the optical article varies across the body, decreasing from the first surface to about the center of the body and increasing from about the center of the body to the second surface; the optical article shows no visible scratches under the stress of weight of at least 100 grams; and the polymerizable composition comprises (i) at least 50 percent by weight of at least one tetrafunctional acrylate monomer, wherein the acrylate monomer is not a tetraacrylic urethane, (ii) from about 5 to about 30 percent by weight of at least one modified bisphenol A epoxy diacrylate monomer, and (iii) from about 0.01 to about 3 percent by weight of at least one UV absorber;
   wherein all percents by weight are based on a total weight of the polymerizable composition.

2. The optical article of claim 1, wherein the hardness of the optical article across the body is substantially symmetrical about the center of the body.

3. The optical article of claim 1, wherein the tetrafunctional acrylate monomer is selected from the group consisting of penataerythritol tetraacrylate, di-trimethylolpropane tetracrylate, ethoxylated pentaerythritol tetraacrylate, pentacrythritol acrylate, and combinations thereof.

4. The optical article of claim 1, wherein the optical article is an optical lens.

5. An optical article comprising a product resulting from a polymerization reaction of a polymerizable composition, wherein the polymerizable composition comprises:
   (a) at least 50 percent by weight of at least one tetrafunctional acrylate monomer, wherein the acrylate monomer is not a tetraacrylic urethane;
   (b) from about 5 to about 30 percent by weight of at least one modified bisphenol A epoxy diacrylate monomer; and
   (c) from about 0.01 to about 3 percent by weight of at least one UV absorber;
   wherein all percents by weight are based on a total weight of the polymerizable composition.

6. The optical article of claim 5, wherein the polymerizable composition further comprises from about 0 to about 25 percent by weight of at least one acrylate monomer selected from aliphatic difunctional and polyfunctional acrylates based on a total weight of the polymerizable composition, wherein the polyfunctional acrylates have at least three functional groups.

7. The optical article of claim 5, wherein the tetrafunctional acrylate monomer is present in an amount ranging from about 55 percent to about 75 percent by weight based on a total weight of the polymerizable composition.

8. The optical article of claim 5, wherein the modified bisphenol A epoxy diacrylate is a low viscosity modified epoxy acrylate.

9. The optical article of claim 5, wherein the modified bisphenol A epoxy diacrylate is a bisphenol A epoxy diacrylate diluted by tripropylene glycol diacrylate, the tripropylene glycol diacrylate comprising a branched alkyl polyether backbone.

10. The optical article of claim 5, wherein the optical article comprises a body having:

a first surface;

a second surface opposite the first surface;

at least one peripheral edge joining the first surface and the second surface;

a central portion located between the first surface and the second surface; and a thickness extending a distance from the first surface to the second surface;

wherein th body has a hardness such that the hardness of the body at the first surface and the second surface is greater than the hardness of the body at the central portion.

11. The optical article of claim 10, wherein the hardness of the optical article along the thickness of the body is substantially symmetrical about the central portion of the body.

12. The optical article of claim 10, wherein the central portion of the body is a substantially equal distance from the first surface and the second surface of the body.

* * * * *